Aug. 1, 1939.　　　　　E. H. BERNO　　　　　2,167,706

BRAKE

Filed July 28, 1932　　　　　2 Sheets-Sheet 1

INVENTOR.
EDWARD H. BERNO
BY
ATTORNEY

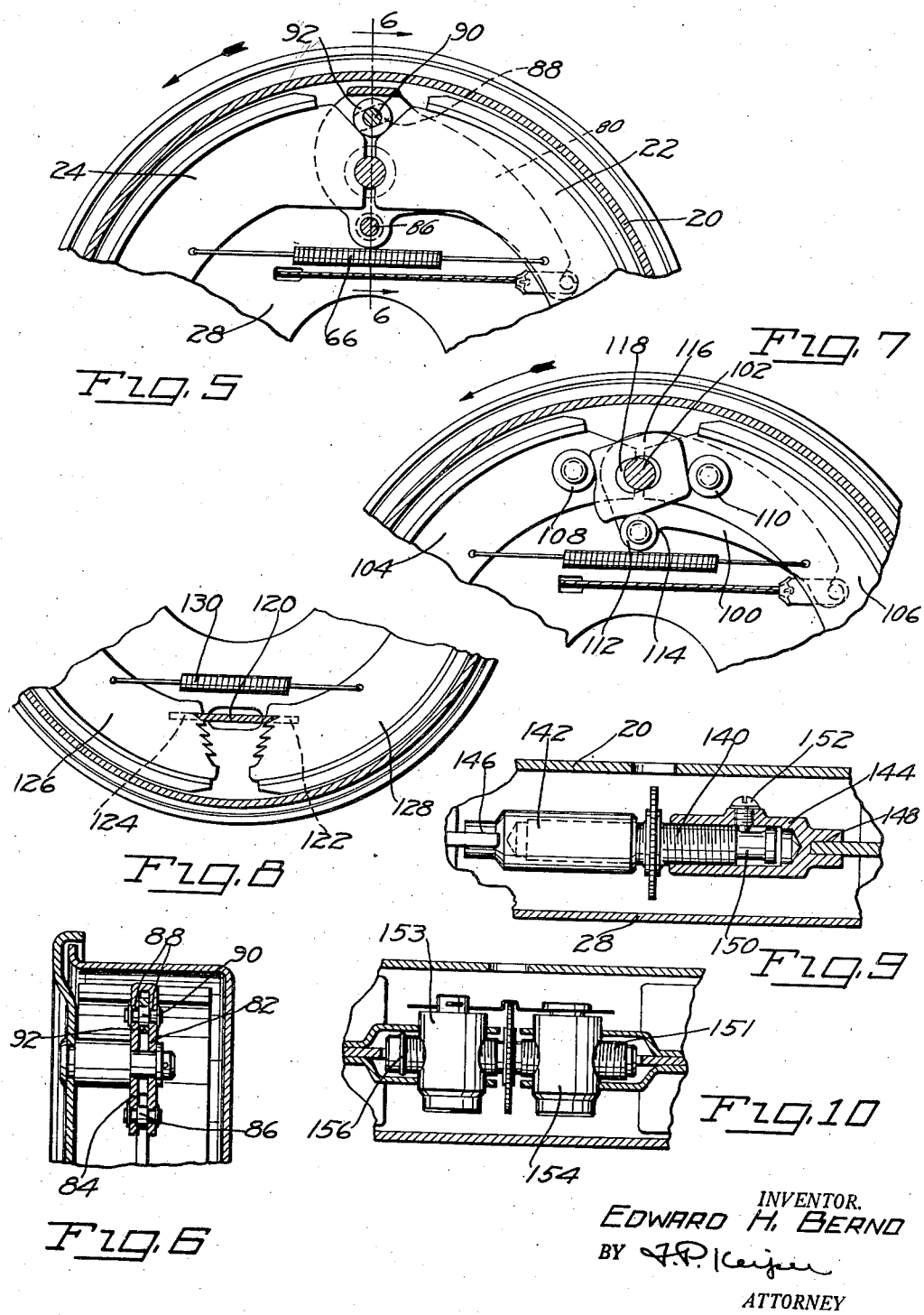

Patented Aug. 1, 1939

2,167,706

UNITED STATES PATENT OFFICE 2,167,706

BRAKE

Edward H. Berno, South Bend, Ind., assignor to Bendix Aviation Corporation, South Bend, Ind., a corporation of Delaware Application July 28, 1932, Serial No. 625,433

20 Claims. (Cl. 188—78)

This invention relates to brakes and is illustrated as embodied in a brake of the internal expanding type wherein floating friction shoes are used.

In the above type of brake employing friction means such as a pair of shoes linked together and adapted to float to an anchor means located adjacent one pair of shoe ends, considerable difficulty is had in providing an actuating cam which is readily adapted to float with the shoes, and actuate the shoes an equal amount regardless of the direction of rotation of the brake, or the position to which the friction shoes may float.

In four wheel brake installations wherein the actuating means for the brakes at the front of the vehicle are in effect reversed from those at the rear of the vehicle, due to the linkage from the front brakes extending rearward, and the linkage of the rear brakes extending forward, considerable difficulty results from this unequal action, since the various brakes which are hooked up for simultaneous action do not have the same travel for an equal brake application. Should the parts of the rear brakes be arranged the same as the parts of the front wheel brakes rather than reversed, the control pedal movement would have to be greater for one direction of braking than for the other thus requiring a large reserve pedal movement for safety purposes.

Several features of this invention are adapted to overcome these difficulties by utilizing the floating movement of the shoes in a manner so as to control the actuating cable or linkage movement, while others relate to certain features of adjustment mechanism or steady rests readily adapted for use in the floating shoe type of brake illustrated herein.

Accordingly it is an object of this invention to provide an actuating mechanism which may to a considerable extent improve the above difficulties pointed out.

A further object is the provision of actuating mechanism utilizing the floating movement of the brake shoes for the purpose of regulating the movement of the actuating linkage or cable.

A further object is the provision of a lever pivoted to one shoe and having camming action with the other and a floating equalizing connection to an operating lever for equal action.

A further object is the provision of novel actuating mechanism utilizing an operating lever pivoted on the brake anchor, and adapted to spread a pair of floating shoes.

A further object is the provision of novel adjusting mechanism of few parts and simple construction.

A further object is the provision of novel adjusting mechanism adapted to prevent too great an adjustment for wear, thus preventing adjustment after the friction lining is worn.

A further object is the provision of a novel steady rest adapted to retain the brake shoes in engagement with the brake backing plate.

The above and other novel features of the invention will appear more fully hereinafter from the following detailed description when taken in conjunction with the accompanying drawings. It is expressly understood however that the drawings are employed for purposes of illustration only and are not designed as a definition of the limits of the invention, reference being had for this purpose to the appended claims.

In the drawings wherein similar reference characters refer to similar parts throughout the several views:

Figure 5 is a portion of a brake illustrating another modification of an actuating mechanism;

Figure 6 is a section of Figure 5 taken on the 6—6 illustrating the details thereof;

Figure 7 is a front elevation of a further modified form of actuating mechanism;

Figure 8 is illustrative of an alternative form of adjustment from that shown in Figure 1; and Figures 9 and 10 are illustrative of adjustment devices having a limiting means therefor.

Figure 1:
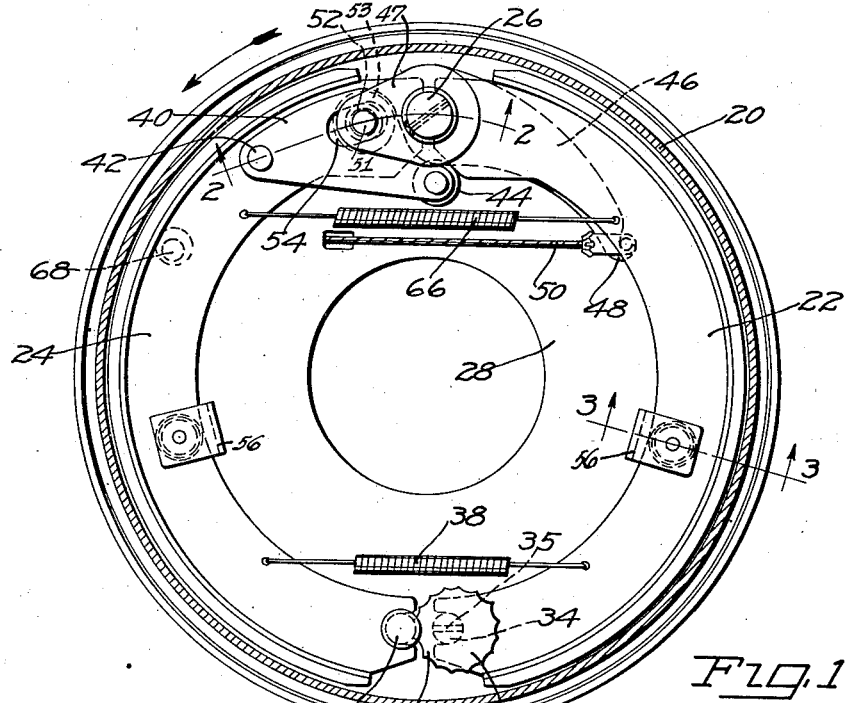
Figure 1 is a front elevation partly in section of a brake employing an equal action brake actuating mechanism.

Referring more particularly to Figure 1, there is shown therein the usual brake drum 20, friction shoes 22, and 24, anchor 26 and backing plate 28. The shoes are of the floating type and are adapted to thrust one another through the intermediary of the adjusting mechanism 30, comprising a notched wheel 32 eccentrically pivoted in the end of shoe 22 as shown at 34. The other shoe 24 is provided preferably with a pin 36 which is so shaped as to engage the notches of the wheel 32. A spring 38 retains the parts in contact and prevents unintentional rotation of the notched wheel.

Figure 2:
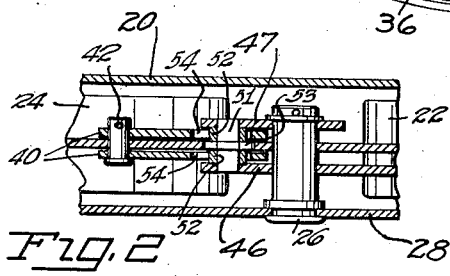
Figure 2 is a section of Figure 1 taken on the line 2—2 and illustrating the actuating mechanism.

To actuate the shoes there is provided at their other pair of adjacent ends, a novel actuating means comprising a lever 40 preferably pivoted on the shoe 24 as at 42 and comprising a pair of similar stampings which are cut away to clear the anchor 26 and carry at their ends a roller 44. The other shoe 22 is provided at its end with an inclined edge adapted to engage the roller in such a fashion that movement of the lever 40 with its roller will cause relative spreading movement between the adjacent shoe ends. To actuate the lever 40, which necessarily floats with the shoe 24, into or out of anchor engagement depending upon the direction of drum rotation, a second operating lever 46 is provided which is pivotally mounted on the anchor 26, and at one end provided preferably with a hook 48 to which a cable as at 50 may be secured. The other end of the lever may be provided with a reinforcing member 47 pivoted on the anchor as shown in Figure 2 and shaped like the end of the lever 46, and between the lever and which is a roller 52 adapted to run in a generally circumferential slot 54 in the lever 40, and which passes through an opening 53 in the web of the shoe 24 large enough to give ample space for its movements. In the arrangement illustrated, lever 46 and member 47 carry a centrally-flanged pin 51 on which are mounted two rollers 52, one riding in the slot 54 of each of the parts of lever 40. The slot however may be set at any angle desired but preferably is generated at such a slope as to correct for any unequal action due to floating of the shoes. A generally circumferential slot may be found to be about the correct slope, since the slot is displaced from the anchor and will therefore bear an angular relation other than right angle with a radius through the brake center and anchor.

Figure 3:
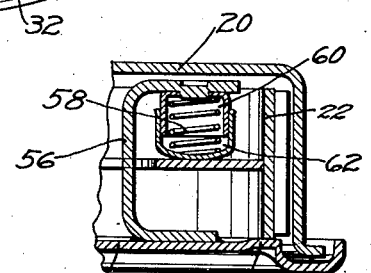
Figure 3 is a section of Figure 1 taken on the line 3—3 illustrating a preferred form of steady rest.

Suitable steady rests 56 as shown in detail in Figure 3, may be provided to retain the shoes against the backing plate 28. As shown, there is provided a U-shaped strip 56 welded or otherwise secured to the backing plate, adapted to project out and around the shoe flange. A spring 58 located within a pair of telescoping cup members 60 and 62 one of which is secured to the strip 56 and the other of which frictionally engages the shoe web, retains the shoe against the backing plate, or a raised portion 64 thereof adapted to engage the shoe, in proper position. A spring 66 together with a suitable eccentric 68, if desired, may be provided for retaining a proper release position of the shoes.

Figure 4:
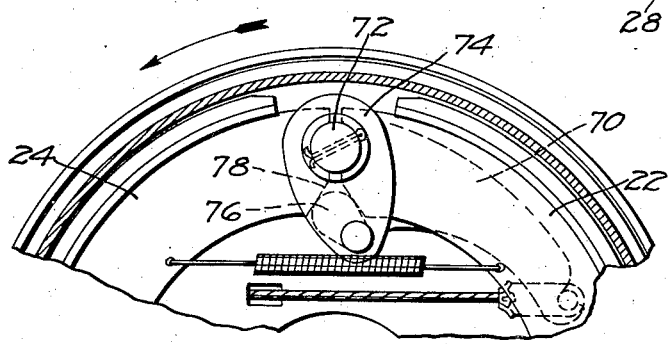
Figure 4 is a portion of a brake showing a modified form of actuating mechanism.

The modification of Figure 4 also shows an actuating mechanism having a lever pivoted to the anchor. In this modification the lever 70 is pivoted on the anchor 72 behind the webs of the shoes 24 and 2. A plate 74, pivoted on the anchor in front of the webs is adapted, together with the lever, to carry the pivoted pear shaped cam member 76. The edges 78 of the shoe web are inclined preferably as shown, so that upon rocking of the lever 70, the cam member, by a type of toggle action, is thrust between the shoes and causes them to separate. Should the brake be so adjusted as to permit the toggle to nearly straighten out or take a radial position, substantially equal action will occur, since in that event member 76 will be moving radially with a substantially equal wedging action on the ends of the two shoes.

The modification of Figure 5 is similar to that of Figures 4 and 1 in that the operating lever is pivoted on the anchor pin. As shown in Figure 6, the operating lever 80 is preferably made of a U-shaped stamping having sides 82 and 84 joined together by a reinforcing shouldered rivet 86 located below the anchor. Inclined slots 88 are provided in the lever above the anchor and carry a short rotatable pin 90 which in turn carries a roller 92. The webs of the brake shoes are provided with inclined edges between which the roller 92 is adapted to be forced by rocking of the operating lever; thus spreading the shoes and into engagement with the drum.

In Figure 7 there is shown a form of actuating mechanism also preferably having an operating lever pivoted upon the anchor pin. As illustrated, the lever 100 is pivoted upon the anchor 102 and positioned behind the webs of the shoes 104 and 106. Each of the shoes is provided with rollers 108 and 110, together with a roller 112 pivotally secured to a depending projection 114 of the lever 100. A cam 116, provided with a slot 118 for floating movement on the anchor, is retained between the rollers 108, 110 and 112, and adapted to be rotated by the movement of the roller 112 when the operating lever 100 is moved. The various edges, or cam surfaces of the cam 116, together with the angle of the slot 118 are so generated so that the floating movement of the shoes corrects for the unequal action due to the movement of the shoes, and a resultant equal action in both directions of rotation is obtained.

A form of adjustment shown in Figure 8 comprises a connecting link 120 having deep slots 122 and 124 in each end thereof, in which the webs 126 and 128 of the adjacent shoes are adapted to be positioned. The ends may be suitably notched to provide different lengths so that shifting the link from one pair of notches to another may vary the adjustment of the shoes to compensate for wear. The spring 130 is provided to retain the parts in compression, and prevent them from becoming displaced.

The adjustments of Figures 9 and 10 are readily adapted for use with the floating shoe type of brake shown in Figure 1 and are adapted to prevent excess adjustment after a maximum adjustment for wear has been made, thereby preventing wearing all the lining off the brake shoes or below the holding rivets, and thus preventing the drum from any possibility of scoring.

In Figure 9 the usual right and left threaded adjustment screw 140 is provided threaded into sockets 142 and 144 which engage the adjacent shoe webs by notches 146 and 148. To prevent over adjustment near one end of the screw 140 is provided a reduced diameter portion 150 of a length commensurate with the adjustment to be permitted. A screw 152 having a smooth portion, is threaded in the socket 144 and projects into the reduced diameter portion, thus limiting the longitudinal movement of the screw. Should an emergency adjustment be required, the screw may be removed and an adjustment made, but the construction may be so arranged as to necessitate removal of the wheel to so do.

In Figure 10, the right and left threaded adjustment screw 151 is shown as threaded into trunnions 153 and 154. To prevent over adjustment a ring 156 preferably split, may be seated in a groove provided in one of the threads, thus limiting the longitudinal adjustment. The lock ring may be installed by pivoting the adjustment screw at right angles to the brake shoe, thus bringing the ring groove clear of the shoe flange.

To do this also may require disassembly to a certain degree.

Referring to Figure 1, it will be seen that tension applied to cable 50 will rock the lever 46, thrusting the roller 52 upward and swinging the lever 40 so as to expand the shoes. Should unequal action result between braking forward and reverse, the slot 54 is so sloped that the floating movement of the shoes will correct the relation between levers 46 and 40 and thereby compensate and produce equal action. The adjustment eccentric 32 may best be operated by a screw driver operating in the slot 35, and to effect adjustment, the eccentric may be turned as far as possible, engaging the shoes, and backed up as many notches as may be necessary to provide proper clearance.

Though several embodiments and modifications of the invention have been illustrated and described, it is to be understood that the invention is not limited thereto, but may be embodied in various mechanical forms. As various changes in construction and arrangement of the parts may be made without departing from the spirit of the invention, as will be well understood by those skilled in the art, reference will be had to the appended claims for a definition of the limits of the invention.

I claim:

1. A brake comprising a drum, a single anchor therein, a friction shoe having separable ends engaging said anchor, adjacent portions of said ends having edges inclined from a radial direction, a roller adapted to move radially between said inclined edges to spread said shoes, and an actuating lever pivoted on said anchor and having a substantially spiral slot engaging said roller, to transmit radial movement thereto upon rotation of said lever.

2. A brake comprising an anchor, a friction shoe having separable ends engaging said anchor, adjacent portions of said ends having inclined edges, a member adapted to move radially between said edges to spread said shoes, and an actuating lever pivoted on said anchor adapted to move said member radially upon actuation thereof.

3. A brake comprising an anchor, a friction means having separable ends, engaging said anchor, one of said ends having an inclined edge adjacent the anchor, means including a roller adapted to move radially against said inclined edge and thrust apart said ends, and an actuating lever pivoted on the anchor for imparting radial movement to said means.

4. A brake comprising a cylindrical anchor, a pair of friction shoes having a pair of adjacent separable ends engaging said anchor, one of said ends having an inclined edge, means including a roller adapted to move radially against said inclined edge and thrust apart said ends, a lever pivoted on the anchor to actuate said means, and an adjustment between the other pair of adjacent separable ends.

5. A brake comprising a friction shoe having a web, a backing plate, a bearing surface upon said backing plate for said shoe and resilient means mounted on said backing plate for frictionally engaging said web and thrusting said shoe against the said bearing surface including a member encircling the web and having at its end opposite the backing plate telescoping parts having a spring confined between them.

6. A brake comprising an anchor, friction means having separable ends engaging said anchor and formed with wedge surfaces, an actuating lever pivoted on said anchor, and a roller engaging the wedge surfaces and operable upon actuation of said lever to spread said ends.

7. A brake comprising a backing plate, an anchor, friction means having separable ends engaging said anchor, an actuating lever pivoted upon said anchor in the space between the backing plate and the friction means, a spreading element operable by said actuating lever adapted to be thrust between the separable ends of said friction means for spreading thereof, and a tension operating connection extending through the backing plate and connected to said lever.

8. A brake comprising an anchor, a friction means having separable ends, engaging said anchor, one of said ends having an inclined edge, means including a roller adapted to move radially against said inclined edge and thrust apart said ends, an actuating lever pivoted on the anchor for imparting radial movement to said means, and an adjustment for said friction means.

9. A brake comprising a drum, a backing plate, an anchor on said backing plate, a pair of adjustably connected friction members, an adjacent pair of ends thereof engaging said anchor, means to spread said ends comprising an inclined edge on one end of at least one of said members, a thrust member adapted for radial movement between said ends to expand said friction members, an actuating lever pivoted on said anchor and adapted to move said thrust member radially, a bearing surface for at least one of said friction members on said backing plate and means on said backing plate for resiliently and frictionally engaging and thrusting said bearing member against said surface.

10. A brake comprising an anchor, friction means having separable ends, one end having an inclined edge, the other end carrying a link pivoted a short distance back from the other end and bearing on said edge, and means for thrusting said link radially to spread the separable ends including a lever fulcrumed on the anchor and having roller-and-slot engagement with said link.

11. A brake comprising an anchor, friction means having separable ends adapted to engage the anchor, said ends having inclined edges, an actuating lever pivoted on said anchor, a thrust member eccentrically pivoted to said actuating lever on an inclined line passing through the anchor, and adapted to be thrust between said inclined edges, upon movement of said actuating lever to bring the inclined line coincident with a radius passing through the anchor.

12. A brake comprising an anchor, spreadable shoes normally in engagement therewith, actuating means comprising a lever pivoted on the anchor, and an element in engagement with the shoe ends pivoted on the lever normally to one side of the anchor center line for spreading said shoes upon movement of said pivoted end towards the anchor center line.

13. A brake comprising an anchor, friction means having separable ends engaging said anchor, an actuating lever pivoted on said anchor, a link pivoted to the friction means a short distance from the end and adapted to engage an inclined edge of the other end, and a roller-and-slot floating connection between said lever and said link for radially thrusting the link and separating said ends.

14. A brake having a single anchor only, a cam floating with respect thereto and having a thrust surface, and a lever pivoted on said anchor and carrying a roller engaging said surface.

15. A brake comprising a drum, floating friction means, an anchor, a floating actuating means movably mounted thereon and a lever pivoted thereon, and means including a roller for operating said actuating means by said lever and utilizing the floating of said actuating means to compensate for unequal movement of said lever for equal brake effect in opposite directions of drum rotation.

16. A brake comprising a backing plate having mounted thereon floating friction means having adjacent separable ends and provided with an anchor arranged between said ends, a pair of operatively-connected operating levers moving in a plane paralleling the backing plate and one of which is pivoted on said anchor and the other of which has associated therewith spreading means acting on said ends, and an operating device extending through the backing plate into the brake and connected to said one of the levers.

17. A brake comprising a drum, floating friction means, a floating actuating means, a single anchor only, a lever pivoted thereon, and means including a roller for operating said actuating means by said lever and utilizing the floating of said actuating means to compensate for unequal movement of said lever for equal brake effect in opposite directions of drum rotation.

18. In a brake, a drum, a floating brake shoe engageable therewith and having separable ends, an anchor between said ends, means for spreading said ends apart and which is shiftable to compensate for movement of said ends when one of them anchors and the other moves away from the anchor to cause engagement of the shoe with the drum, and operating means fulcrumed on said anchor and slidably engaging said means to apply said shoe to the drum when said operating means is swung on said anchor.

19. In a brake, a drum, a brake shoe engageable therewith and having separable ends, an anchor between said ends, a lever engaging said ends and movable relative thereto for separating the same, said lever having an arcuate surface, an arm pivotally connected to the anchor and having means bearing on said arcuate surface of the lever for operating the latter, a cable for operating said arm, and spring means for returning the arm to brake release position.

20. In a brake, a drum, a brake shoe engageable therewith and having separable ends, an anchor between said ends, a pivotally mounted lever on one of said ends for separating the same, and a second lever fulcrumed upon the anchor and engaging the first lever for operating the same.

EDWARD H. BERNO.